(12) United States Patent
Demeulenaere et al.

(10) Patent No.: US 10,520,038 B2
(45) Date of Patent: Dec. 31, 2019

(54) METHOD OF MANIPULATING A BEARING CAP

(71) Applicant: Ford Global Technologies, LLC, Dearborn, MI (US)

(72) Inventors: Xavier Demeulenaere, London (GB); Graham Slaughter, Brentwood (GB); Mark Michel, Dartford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 15/399,546

(22) Filed: Jan. 5, 2017

(65) Prior Publication Data
US 2017/0204910 A1    Jul. 20, 2017

(30) Foreign Application Priority Data

Jan. 19, 2016    (GB) .................................... 1601002.7

(51) Int. Cl.
*F16C 35/067*    (2006.01)

(52) U.S. Cl.
CPC ........ *F16C 35/067* (2013.01); *F16C 2360/22* (2013.01)

(58) Field of Classification Search
CPC .......... F16C 35/067; F16C 35/00; F16C 3/20; F16C 2360/22; F16F 15/267; Y10T 29/49826; Y10T 29/49947; Y10T 29/49948; Y10T 29/49636; Y10T 29/49696; Y10T 29/49698; Y10T 29/497
USPC ........ 384/433; 29/428, 525.01, 525.02, 898, 29/898.07, 898.08, 898.09
See application file for complete search history.

(56) References Cited

U.S. PATENT DOCUMENTS

| | | | | |
|---|---|---|---|---|
| 4,916,791 A | * | 4/1990 | Clouse | B25B 27/023 29/261 |
| 5,058,256 A | * | 10/1991 | Taylor | B25B 27/062 29/260 |
| 6,418,600 B1 | * | 7/2002 | Benoit | B25B 27/06 29/256 |
| 10,233,967 B2 | * | 3/2019 | Sakurai | F16C 17/047 |
| 10,233,970 B2 | * | 3/2019 | Yang | F16C 33/046 |
| 10,274,016 B2 | * | 4/2019 | Carter | F16C 35/067 |
| 2002/0094143 A1 | * | 7/2002 | Yang | F16C 9/02 384/294 |

(Continued)

FOREIGN PATENT DOCUMENTS

| | | |
|---|---|---|
| CN | 101629598 A | 1/2010 |
| CN | 202326758 U | 7/2012 |

(Continued)

OTHER PUBLICATIONS

Machine Translation of JPS52135947 to Yoshiaki, dated Nov. 14, 1977.*

(Continued)

*Primary Examiner* — Sarang Afzali
*Assistant Examiner* — Darrell C Ford
(74) *Attorney, Agent, or Firm* — Geoffrey Brumbaugh; McCoy Russell LLP

(57) ABSTRACT

A method of manipulating a bearing cap for a machine, the method comprising: attaching an intermediate member to the bearing cap, the intermediate member having one or more handling formations; and using the handling formations of the intermediate member to manipulate the bearing cap.

8 Claims, 6 Drawing Sheets

(56) References Cited

U.S. PATENT DOCUMENTS

| | | | | |
|---|---|---|---|---|
| 2003/0128902 | A1* | 7/2003 | Kennedy | F16C 9/02 |
| | | | | 384/275 |
| 2005/0264116 | A1* | 12/2005 | Borcherding | H02K 5/15 |
| | | | | 310/90 |
| 2006/0248724 | A1* | 11/2006 | Smolarek | B23D 31/003 |
| | | | | 29/898.08 |
| 2008/0067729 | A1* | 3/2008 | McKown | B23Q 3/062 |
| | | | | 269/313 |
| 2010/0189501 | A1* | 7/2010 | Grabnic | E01C 19/38 |
| | | | | 404/133.05 |
| 2012/0207415 | A1* | 8/2012 | Tusinean | F16J 7/00 |
| | | | | 384/270 |
| 2013/0146018 | A1* | 6/2013 | Brautigam | B23P 15/003 |
| | | | | 123/195 R |
| 2013/0243358 | A1* | 9/2013 | Stork | B25B 7/00 |
| | | | | 384/445 |

FOREIGN PATENT DOCUMENTS

| | | |
|---|---|---|
| CN | 202955133 U | 5/2013 |
| CN | 203412670 U | 1/2014 |
| JP | S52135947 A | 11/1977 |
| JP | H07112895 A | 5/1995 |
| JP | 5223812 B2 | 3/2013 |

OTHER PUBLICATIONS

Examination Report for Great Britain Patent Application No. 1601002.7, filed Jun. 30, 2016, United Kingdom Intellectual Property Office, 6 pages.

National Intellectual Property Administration of the People's Republic of China, Office Action and Search Report Issued in Application No. 201710032945.5, dated Sep. 18, 2019, 9 pages. (Submitted with Partial Translation).

* cited by examiner

METHOD OF MANIPULATING A BEARING CAP

CROSS REFERENCE TO RELATED APPLICATION

The present application claims priority to Great Britain Patent Application No. 1601002.7, filed on Jan. 19, 2016. The entire contents of the above-referenced application are hereby incorporated by reference in its entirety for all purposes.

This disclosure relates to a method of manipulating a bearing cap for a machine, and in particular, but not exclusively, relates to manipulating the bearing cap using a bearing clip which is configured to retain the bearing in position.

INTRODUCTION

A balancer shaft for an engine is typically located within the engine casing, for example the balancer shaft may be assembled onto a ladder frame casing of the engine. The balancer shaft can be mounted on balancer shaft bearings, which can each be secured in place on the ladder frame using a bearing cap, for example a ladder frame cap.

On a modern production line, the bearing cap is typically installed using an automated process, and as such it is desirable for the bearing cap to have gripping features that allow for the automated handling of the bearing cap during assembly of the engine. The gripping features may also be useful when removing the bearing cap, for example during tear-back and/or rework of the engine.

It is known to provide a flange on the bearing cap and/or a cut-out into the bearing cap for use as the gripping feature. If the bearing cap is a cast part, the tool parting line must allow for the gripping feature to be included in the bearing cap. If it is not possible to cast the gripping features, they can be machined into the bearing cap, which adds additional cost and time to the manufacturing process.

One problem is that there is usually a lack of packaging space around the bearing cap when installed into the engine casing, which makes it difficult to include additional flanges as these can increase the overall size of the bearing cap. Another problem is that the gripping feature must have a sufficient size to allow an automated tool to grip the part, and thus it is difficult to include a large enough cut-out into the bearing cap owing to the required configuration of the bearing cap. A further problem is that other engine components, such as an oil pump, may be assembled close to and around the bearing cap, which can block access to the bearing cap's gripping features in an assembled configuration.

STATEMENTS OF INVENTION

According to an aspect of the present disclosure there is provided a method of manipulating a bearing cap for a machine, for example an engine, the method comprising: attaching a bearing clip to the bearing cap, the bearing clip being configured to retain a bearing within an opening of the bearing cap and having one or more handling formations; and using the handling formations of the bearing clip to manipulate the bearing cap. The bearing cap may be any appropriate type of bearing cap, for example a balancer shaft bearing cap, a cam shaft bearing cap, or a crankshaft bearing cap, amongst others.

The method may comprise installing the bearing cap onto the machine, for example onto a machine casing, using an intermediate member comprising a bearing clip, the bearing clip being configured to retain a bearing within an opening of the bearing cap and having one or more handling formations. For example, the method may comprise assembling the bearing cap onto the machine using the intermediate member. The method may comprise removing the bearing cap from the machine using the intermediate member. For example, the method may comprise disassembling the bearing cap from the machine using the intermediate member. The method may comprise removing the intermediate member from the bearing cap once the bearing cap is installed onto the machine. The method may comprise reattaching the intermediate member to the bearing cap, for example after removing the intermediate member. The intermediate member may be used to install the bearing cap, and may be subsequently removed from the bearing cap, such that the intermediate member does not form part of the machine when fully assembled. Upon disassembly of the machine, for example during tear-back and/or maintenance, the intermediate member may be reattached to the bearing cap so that it can be used to remove the bearing cap from the machine. The intermediate member may be left attached to the bearing cap, such that the intermediate member forms part of the machine when fully assembled.

The method may comprise locating the bearing cap relative to the machine using the intermediate member. For example, the intermediate member may comprise one or more locating features configured to engage a portion of the machine casing to locate the bearing cap relative to the machine casing and/or any other appropriate component of the machine.

According to another aspect of the present disclosure there is provided a bearing cap assembly for a machine, for example an engine, the bearing cap assembly comprising: a bearing cap configured to be assembled to the machine; and a bearing clip configured to attach to the bearing cap, the bearing clip being configured to retain a bearing within an opening of the bearing cap and comprising one or more handling formations configured to be used to manipulate the bearing cap when an intermediate member is attached to the bearing cap. The bearing cap may be configured to secure a bearing against a portion of machine casing. For example, the bearing cap may be a balancer shaft bearing cap configured to secure a balancer shaft bearing against a ladder frame casing of the engine.

An intermediate member, comprising the bearing clip as described above, may comprise one or more handling formations that extend away from the bearing cap when the intermediate member is attached to the bearing cap. The handling formations may be dedicated handling formations. The sole purpose of the handling formations may be to improve the ease of handling of the bearing cap. The handling formations may be configured such that the bearing cap can be manipulated, for example held, moved, positioned and/or located, relative to the machine using an automated assembly tool and/or by hand.

The handling formations may extend away from the bearing cap by approximately 5 mm when the intermediate member is attached to the bearing cap. The handling formations may extend within a region bounded by at least one axial end face of the bearing cap when the intermediate member is attached to the bearing cap. The intermediate member may comprise a first projection and a second projection. The first and second projections may extend away from each other, for example in opposite directions.

The intermediate member may be configured to engage a face of the bearing cap and extend over an edge of the said face. The intermediate member may be configured to extend at least partially through an opening in the bearing cap. The intermediate member may attach to the bearing cap using one or more fasteners, which may be configured to secure the bearing cap to the machine.

There is provided a machine, for example an engine, comprising one or more of the above mentioned bearing cap assemblies. To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings. The figures are drawn to scale, although other relative dimensions may be used, if desired.

DETAILED DESCRIPTION

Figure 1:
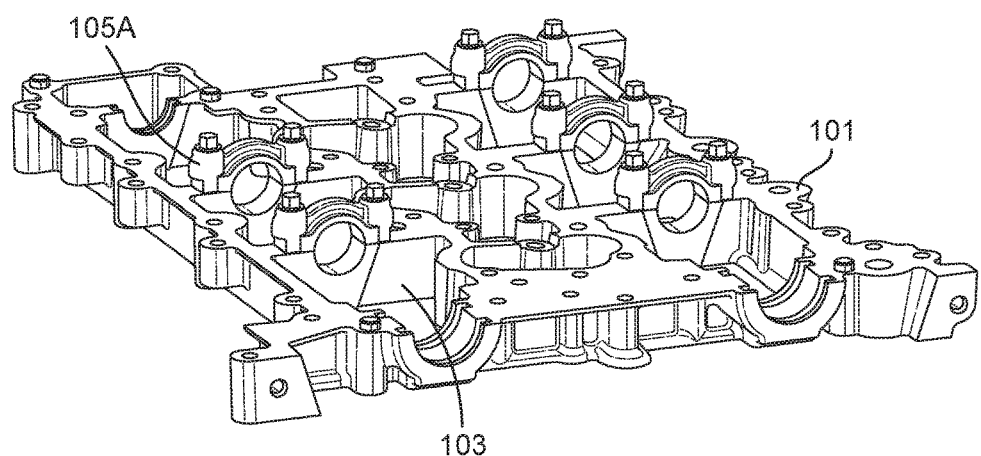
FIG. 1 shows a perspective view of a ladder frame casing and a plurality of bearing caps according to the prior art in an assembled configuration.

FIG. 1 shows a portion of an engine casing 101, such as a ladder frame casing, in which a balancer shaft (not shown) may be installed. The balancer shaft may be rotatably mounted in one or more bearings (not shown) such that the balancer shaft may rotate with respect to the engine casing 101. The bearings can each be held in place relative to a wall 103 of the engine casing 101 using a bearing cap 105A according to the prior art.

The bearing cap 105A is configured to be attached to, for example removably attached to, the wall 103 of the engine casing 101 using one or more fasteners. Dowel pins, or any other appropriate means, may be used to position the bearing cap 105A relative to the wall 103 of the engine casing 101. In this manner, the dowel pins serve to align the bearing cap 105A with the engine casing wall 103, while one or more fasteners may be used to secure the bearing cap 105A to the engine casing 101.

Figure 2:
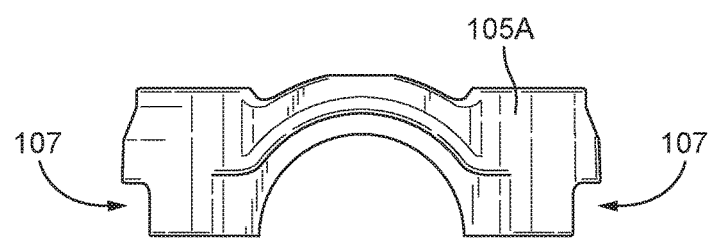
FIG. 2 shows an end view of the bearing cap according to the prior art.

FIG. 2 shows a detailed view of one of the bearing caps 105A shown in FIG. 1. The bearing cap 105A comprises a plurality of gripping features 107 that allow for the automated handling of the bearing cap 105A during assembly of the engine. For example, the gripping features 107 may be configured to engage with a robotic arm of an automated manufacturing station, and/or may be configured to allow a user to manually install and/or remove the bearing cap 105A from the engine casing 101.

Figure 3:
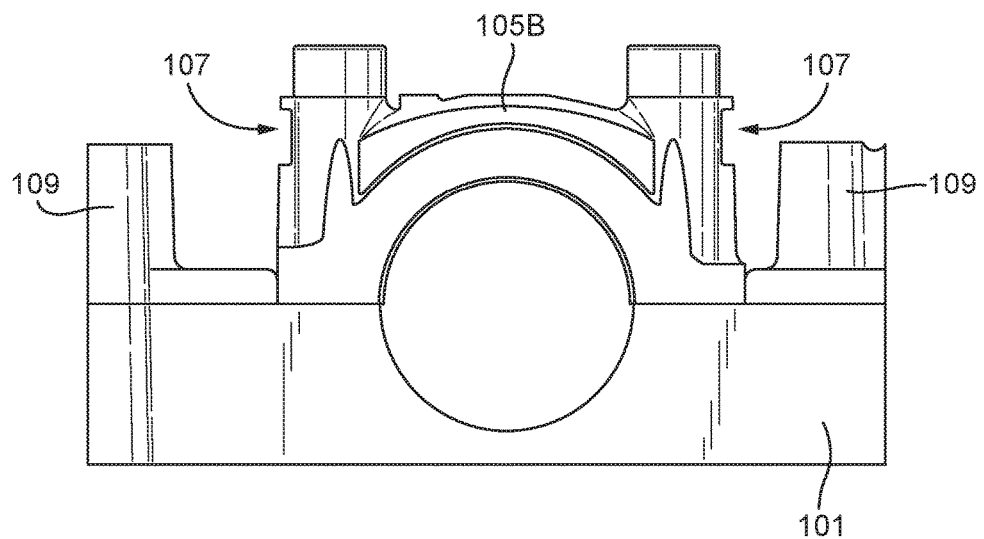
FIG. 3 shows a partial cross section through the ladder frame casing and another bearing cap according to the prior art in an assembled configuration.

In the arrangement shown in FIG. 1, the bearing caps 105A are the only components assembled to the engine casing 101, and as a result access to the gripping features 107 is not impeded by any other components assembled onto the engine casing 101. FIG. 3 shows another example of a bearing cap 105B according to the prior art when installed onto the engine casing 101 along with another component 109, for example an oil pump, or any other appropriate component. In the arrangement of FIG. 3, the gripping features of 107 are provided in a different location on the bearing cap 105B compared to the bearing cap 105A. However, it is clear that even by repositioning gripping features 107, access to the gripping features 107 may still be impeded by at least one other component 109 attached to the engine casing 101. Furthermore, even though the size of the gripping features 107 of bearing cap 105B have been reduced compared to the gripping features 107 of bearing cap 105A, there still may be insufficient access around the bearing cap 105B in an installed configuration.

Figure 4:
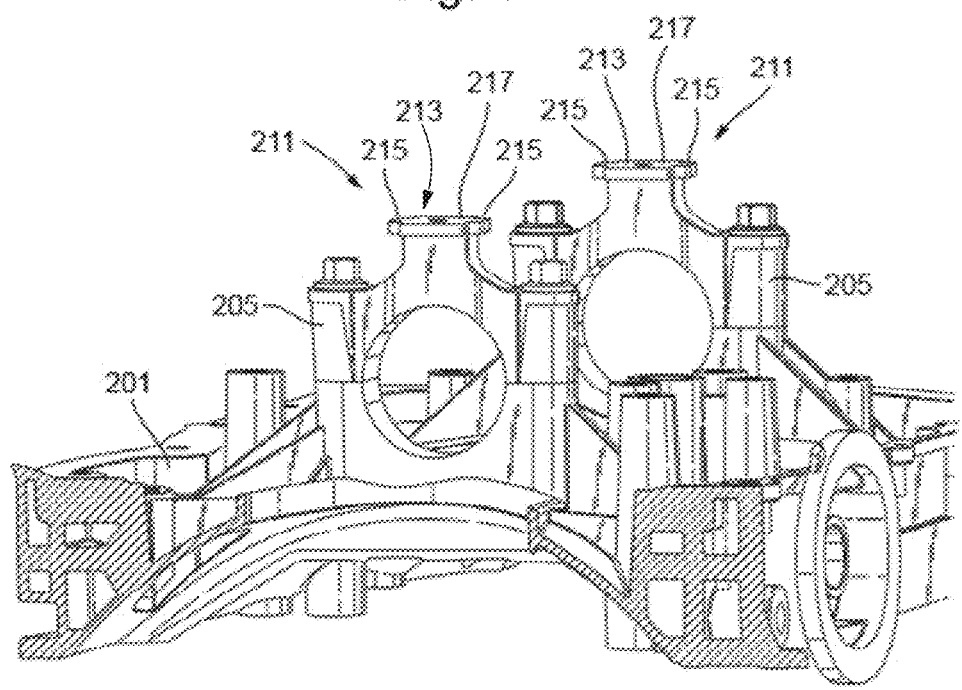
FIG. 4 shows a perspective view of a ladder frame casing and a plurality of bearing cap assemblies according to the present disclosure in an assembled configuration.

FIG. 4 shows a portion of an engine casing 201 and a plurality of bearing cap assemblies 211 according to the present disclosure. In the arrangement shown in FIG. 4, the engine casing 201 is a ladder frame casing configured to support a balancer shaft (not shown), and the bearing cap assemblies 211 are balancer shaft bearing cap assemblies configured to secure respective balancer shaft bearings (not shown) in the ladder frame casing. It is understood, however, that the bearing cap assemblies 211 may be configured to secure any appropriate type of bearing in the engine casing 201. For example, the bearing cap assemblies 211 may be configured to secure a crankshaft bearing, a camshaft bearing and/or any other appropriate type of bearing in the engine casing 201.

The bearing cap assembly 211 comprises a bearing cap 205 and one or more intermediate members 213. The intermediate members 213 are attachable to the bearing cap 205, for example the intermediate member 213 may be removably securable to the bearing cap 205 using one or more fasteners. However, in an alternative arrangement, the intermediate member 213 may be secured to the bearing cap 205 using any appropriate method, for example by virtue of a snap fitting, adhesive and/or welding, among other methods.

Figure 5:
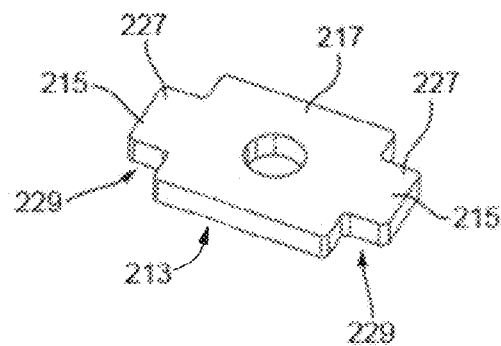
FIG. 5 shows a perspective view of an intermediate member according to the present disclosure.
Figure 6:
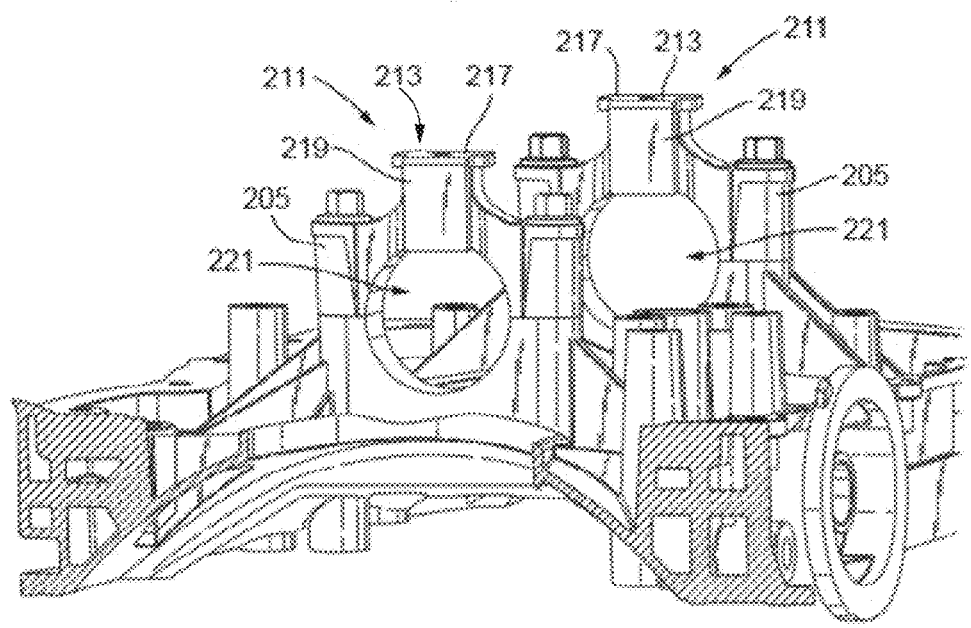
FIG. 6 shows a perspective view of a ladder frame casing and a plurality of bearing cap assemblies according to the present disclosure in an assembled configuration.

As shown in FIGS. 4 and 5, the intermediate member 213 comprises a plurality of handling formations, for example projections 215 or tangs, that can be used by an automated assembly station and/or during a manual operation to hold the bearing cap 205 when the intermediate member 213 is attached to the bearing cap 205. The handling formations may, however, be of any appropriate form that allows them to be used to manipulate the bearing cap 205 when the intermediate member 213 is attached to the bearing cap 205. For example, the handling formations may comprise one or more openings which may be configured to engage a tool and/or an operators fingers. The intermediate member 213 may be used to grip, hold, support and/or manipulate the bearing cap 205 when that intermediate member 213 is attached to the bearing cap 205. In this manner, the bearing cap 205 need not comprise any of the gripping features 107 as shown in the examples according to the prior art. This is advantageous since it simplifies the manufacture of the bearing cap 205, which may reduce the overall cost of the bearing cap 205. Furthermore, as the intermediate member 213 may be removably attachable to the bearing cap 205, a single intermediate member 213 may be used to install and/or uninstall a plurality of bearing caps 205.

The intermediate member 213 may comprise a body portion 217 from which the projections 215 extend. In the arrangement shown in FIGS. 4 to 9, the intermediate member 213 comprises two projections 215 that are co-planar with the body portion 217 of the intermediate member 213 and which extend away from the body portion 217 in opposite directions. However, the intermediate member 213 may comprise any appropriate number of projections 215, each of the projections 215 extending away from the body portion 217 in any appropriate direction and/or by any appropriate amount.

The body portion 217 of the intermediate member 213 is configured to be secured to the bearing cap 205. The intermediate member 213 may be secured to the bearing cap 205 by way of engagement between the body portion 217 of the intermediate member 213 and an appropriate portion of the bearing cap 205. For example, the intermediate member 213 may be configured to attach to the bearing cap 205 such that the projections 215 extend away from the bearing cap 205. The projections 215 may extend away from the bearing cap 205 in any appropriate direction and by any appropriate amount such that an automated handling tool is able to grip the bearing cap assembly 211 using the intermediate member 213. For example, when the intermediate member 213 is attached to the bearing cap 205, the projections 215 may extend away from the bearing cap 205 by approximately 5 mm, thereby allowing sufficient access for the automated handling tool and/or the fingers of any user.

In FIG. 4, the intermediate member 213 is secured to a top face of the bearing cap 205 such that each of the projections 215 extend over respective edges of the top face. In this manner, an automated tool and/or the fingers of an operator may grip the projection 215 using opposing surfaces of the projection 215, e.g. a top surface 227 and a bottom surface 229 of the projection 215. However, in alternative arrangements, one or more of the projections 215 may extend over, for example project beyond, an edge of any appropriate surface of the bearing cap 205. Additionally or alternatively, the intermediate member 213 and the bearing cap 205 may be configured such that the intermediate member 213 extends at least partially through an opening in the bearing cap 205. In such an example, the intermediate member 213 may comprise a pin and the bearing cap may comprise an opening configured to receive the pin.

Figure 7:
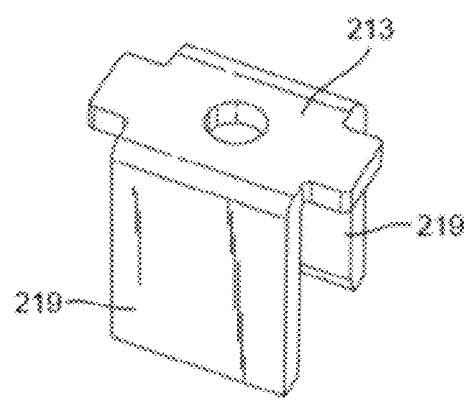
FIG. 7 shows a perspective view of another intermediate member according to the present disclosure.

In the arrangement shown in FIGS. 6 to 9, the intermediate member 213 comprises a clip that is substantially U-shaped in cross section, for example a bridge clip. FIG. 7 shows a detailed review of the intermediate member 213 shown in FIGS. 6, 8 and 9. The intermediate member 213 is similar to the intermediate member 213 of FIGS. 4 and 5, and further comprises a plurality of secondary projections 219 that extend away from the body portion 217. Such secondary projections may be used for one or more other purposes instead or as well as holding the bearing cap 205. For example, the secondary projections 219 may at least partially extend across an opening 221 of the bearing cap 205 when the intermediate member 213 is attached to the bearing cap 205 in order to help position a bearing (not shown) within the opening 221. It is understood, however, that in one or more other arrangements, the projections 215 and the secondary projections 219 may have a common function. For example, in one arrangement the projections 215, 219 may be used to hold and/or support the bearing cap 205 in addition to locating a bearing within the opening 221 of the bearing cap 205.

Figure 8:
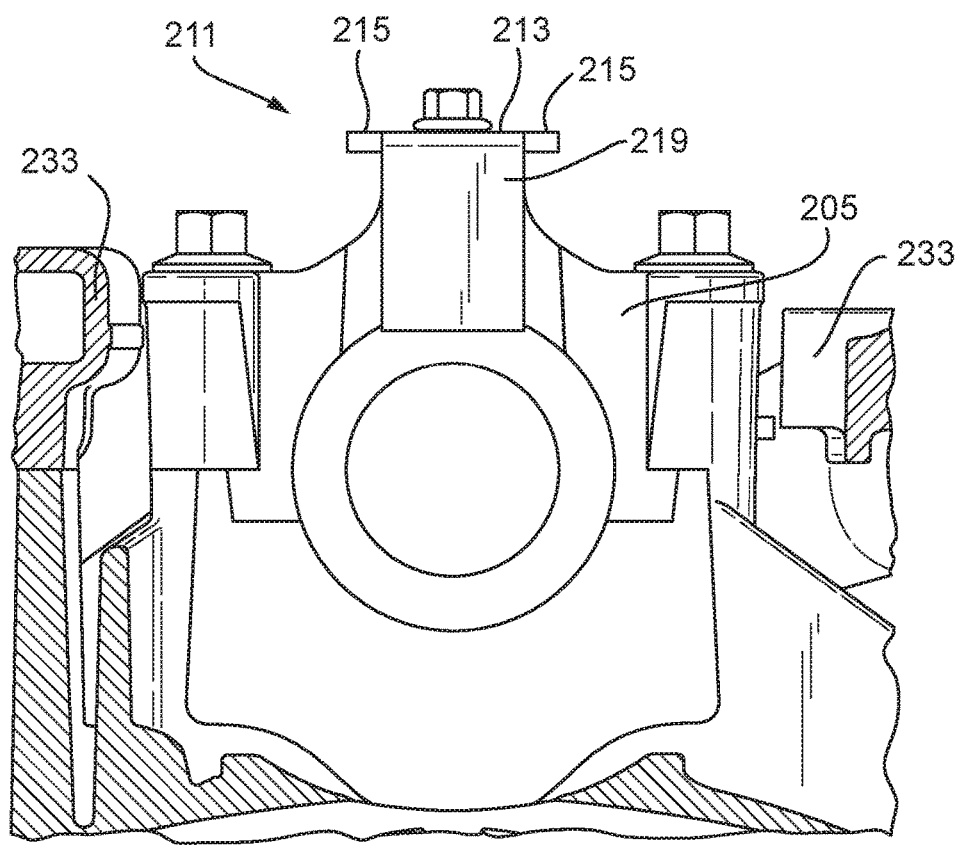
FIG. 8 shows a partial cross section through the ladder frame casing and the bearing cap assembly according to the present disclosure in an assembled configuration.
Figure 9:
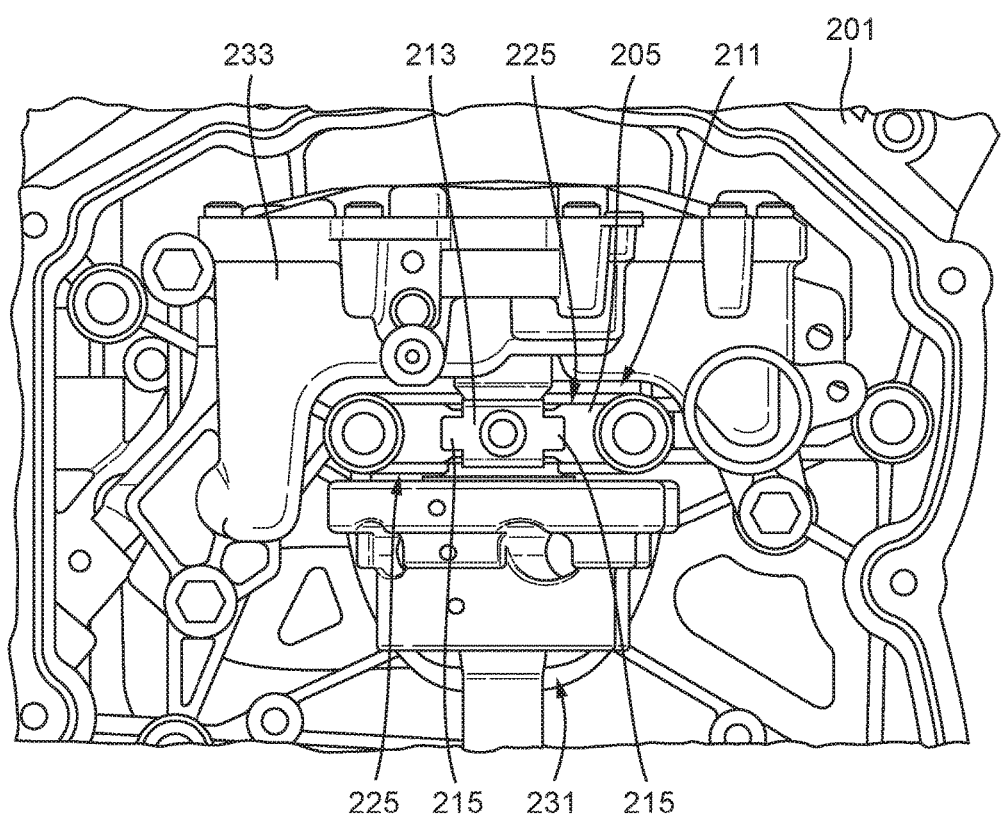
FIG. 9 shows a plan view of the ladder frame casing and the bearing cap assembly according to the present disclosure in an assembled configuration.

FIGS. 8 and 9 show the bearing cap assembly 211 installed into an engine casing 201 along with a balancer shaft assembly 231 and an oil pump 233. In FIGS. 8 and 9, the bearing cap assembly 211 comprises the intermediate member 213 of FIGS. 6 and 7. However, the bearing cap assembly 211 may comprise any appropriately configured intermediate member 213 according to the present disclosure.

Typically, the oil pump 233 is assembled to the engine casing 201 after the bearing cap assembly 211 has been used to secure the balancer shaft assembly 231 to the engine casing 201. In such a situation, the installation of the oil pump 233 restricts access to the bearing cap assembly 211. In the arrangement shown, the projections 215 extend away from the bearing cap 205 within a region bounded by the axial end faces 225 of the bearing cap 205. However, in alternative arrangements, one or more of the projections 215 may extend in any appropriate direction determined by the packaging requirements of the engine. Advantageously, in the arrangement shown in FIGS. 8 and 9, the intermediate member 213 does not increase the overall axial package of the bearing cap assembly 211 when installed into the engine casing 201, yet still allows sufficient access to the intermediate member 213 to install and/or uninstall the bearing cap 205. Indeed, the bearing cap assembly 211 according to the present disclosure allows for the oil pump 233, and/or any other appropriate component, to be installed into the engine casing before the bearing cap assembly 211. Further, since the bearing cap 205 need not be provided with the integral gripping features 107 of the bearing caps 105A, 105B according to the prior art, the packaging requirements of the bearing cap 205 is reduced since the engine need not be configured to allow access to the gripping features 107. As such, the oil pump 233, and/or any other appropriate component, may be packaged closer to the bearing cap 205, which may reduce the overall size of the engine.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the disclosure has been described by way of example with reference to one or more examples, it is not limited to the disclosed examples and that alternative examples could be constructed without departing from the scope of the disclosure as defined by the appended claims.

The invention claimed is:

1. A method of manipulating a bearing cap for a machine, the method comprising:
    attaching a bearing clip to the bearing cap, where the bearing cap is configured to retain a bearing within an opening of the bearing cap, where the bearing clip has a handling formation extending away from a central axis of a through hole and a body portion of the bearing clip in opposing directions, where the bearing clip includes a third projection extending down an axial end face of the bearing cap, and where the bearing clip includes the through hole extending through the body portion; and
    using the handling formation of the bearing clip to manipulate the bearing cap.

2. The method according to claim 1, further comprising installing the bearing cap onto the machine using the bearing clip.

3. The method according to claim 2, further comprising removing the bearing clip from the bearing cap once the bearing cap is installed onto the machine.

4. The method according to claim 3, further comprising reattaching the bearing clip to the bearing cap.

5. The method according to claim 2, further comprising removing the bearing cap from the machine using the bearing clip.

6. The method according to claim 2, further comprising locating the bearing cap relative to the machine using the bearing clip.

7. The method according to claim 1, further comprising removing the bearing cap from the machine using the bearing clip.

8. The method according to claim 1, further comprising locating the bearing cap relative to the machine using the bearing clip.

\* \* \* \* \*